P. O'THAYNE.
Ironing-Machine.

No. 7,936. Reissued Nov. 6, 1877.

Witnesses:
John C. Tunbridge
D. V. Brieen

Inventor:
Patrick O'Thayne
by his attorney
D. V. Brieen

UNITED STATES PATENT OFFICE.

PATRICK O'THAYNE, OF NEW YORK, N. Y.

IMPROVEMENT IN IRONING-MACHINES.

Specification forming part of Letters Patent No. 63,301, dated March 26, 1867; Reissue No. 7,936, dated November 6, 1877; application filed July 25, 1877.

DIVISION A.

*To all whom it may concern:*

Be it known that I, PATRICK O'THAYNE, of the city, county, and State of New York, have invented a new and Improved Ironing-Machine; and I do hereby declare that the following is a full, clear, and exact description thereof, which will enable others skilled in the art to make and use the same, reference being had to the accompanying drawings, forming part of this specification, in which—

Figure 1:
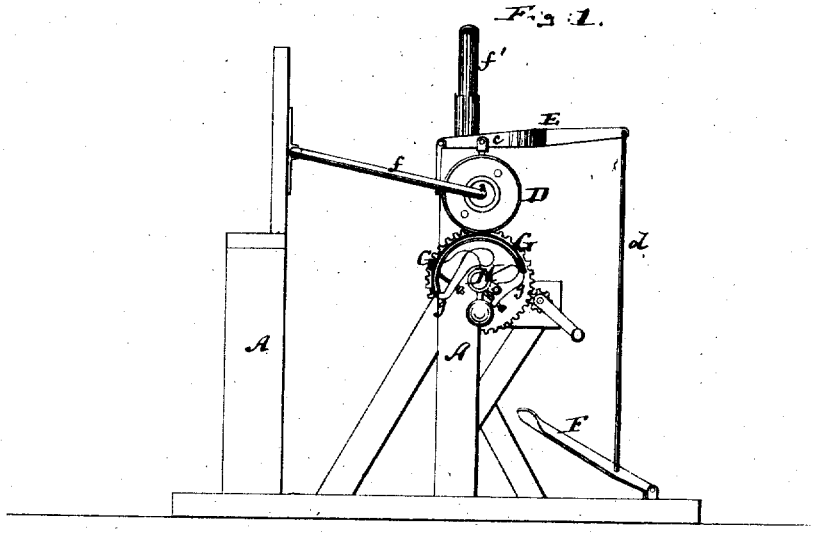
Figure 2:
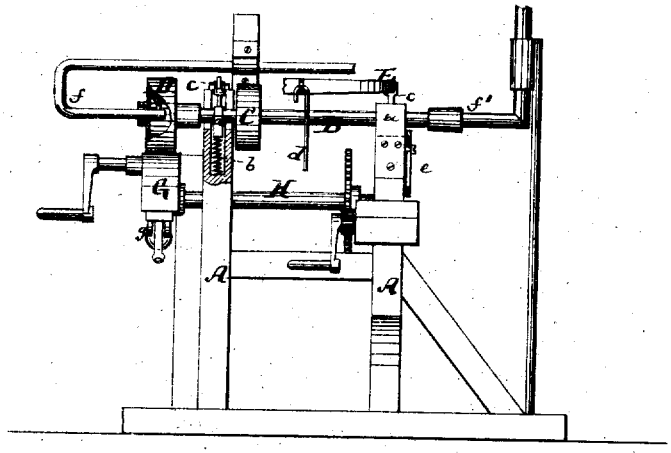

Figure 1 represents a side elevation of this invention, and Fig. 2 a sectional end view of the same.

Similar letters of reference indicate like parts.

This invention relates to a machine for ironing clothes or articles of any description, said machine being composed chiefly of a movable segmental clothes-support, in combination with a smoothing-iron, which is heated by a gas-flame, and so arranged that it can be pressed on the clothes-support and revolved, if it should be desirable.

A represents a frame, made of wood or any other suitable material. In the upper part of this frame are fitted two boxes, *a*, which rest on springs *b*, so that they are yielding, and which form the bearings for a shaft, B. On this shaft is mounted a pulley, C, and a cylindrical smoothing-iron, D, so that, by a belt passing over said pulley, a rotary motion can be imparted to said smoothing-iron.

From the boxes *a* rise two standards, *c c*, to which is pivoted a forked lever, E, that is hung in suitable brackets attached to the frame A, and connected by a rod, *d*, with a treadle, F, so that by pressing on said treadle the boxes *a*, together with the shaft and smoothing-iron, are depressed on the segmental platform G, which supports the articles to be ironed.

The smoothing-iron D is mounted on one end of the shaft B, and in order to compel the same to bear down firmly and evenly on the platform G an adjustable rest, *e*, is attached to the frame A, under that end of the same which is opposite to the smoothing-iron. Said smoothing-iron is heated by a gas-flame, the requisite supply of gas being introduced through a pipe, *f*, and the products of combustion carried off through the shaft B, which is hollow, and connects with the chimney *f'*, as clearly shown in Fig. 2 of the drawing. By the gas-flame the smoothing-iron can be kept hot, whether said iron is made to revolve or used stationary.

The platform G is made in the form of a cylinder or segment of a cylinder, and is mounted on the end of an arbor, H, to which a revolving or vibrating motion can be imparted by a crank and gear, or in any other suitable manner. Said segmental platform may be rigidly connected to the shaft, as shown in the drawings, and in that case suitable clamps or catches *g g* are provided, which serve to secure the articles to be ironed to the platform.

If desired, the segmental platform may be so arranged that it can be turned back on a hinge, so that the same can be conveniently introduced into a shirt or other similar article.

The operation of this machine is very simple, and will be readily understood from the foregoing description.

Instead of the rotating iron D and oscillating or revolving platform G, I may use a stationary smoothing-iron and apply the pressure to the bottom of the platforms by means of springs, screws, or other devices.

Having thus described my invention, I claim as new and desire to secure by Letters Patent—

1. The segmental vibrating platform G, combined with the rotary smoothing-iron D, substantially as herein shown and described.

2. The combination of the cylindrical revolving smoothing-iron D and its hollow shaft B, which has its bearings in the yielding boxes *a*, having standards *c*, with the adjustable rest *e*, lever E, rod, and treadle, substantially as herein shown and described.

3. The segmental platform G, placed upon the shaft H, and provided with the clamps *g g*, in combination with the smoothing-iron D and frame A, substantially as and for the purpose specified.

PATRICK O'THAYNE.

Witnesses:
GEO. L. AMES,
J. TURK.